United States Patent [19]

Baldwin et al.

[11] Patent Number: 4,733,396
[45] Date of Patent: Mar. 22, 1988

[54] APPARATUS FOR DETECTING AND CORRECTING DATA TRANSFER ERRORS OF A MAGNETIC DISK SYSTEM

[75] Inventors: David R. Baldwin, Sheppston, United Kingdom; Shingo Sata, Otawara, Japan

[73] Assignee: Kabushiki Kaisha Toshiba, Kawasaki, Japan

[21] Appl. No.: 937,919

[22] Filed: Dec. 4, 1986

[30] Foreign Application Priority Data

Dec. 5, 1985 [JP] Japan .................................. 60-272412

[51] Int. Cl.$^4$ ............................................. G06F 11/12
[52] U.S. Cl. ......................................... 371/38; 371/39
[58] Field of Search ...................... 371/37, 43, 38, 45, 371/39, 40; 364/200, 900

[56] References Cited

U.S. PATENT DOCUMENTS

| | | | |
|---|---|---|---|
| 4,454,595 | 6/1984 | Cage | 364/900 |
| 4,562,577 | 12/1985 | Glover | 371/38 |
| 4,564,945 | 1/1986 | Glover | 371/38 |
| 4,567,594 | 1/1986 | Deodhar | 371/38 |
| 4,590,559 | 5/1986 | Baldwin et al. | 364/414 |
| 4,604,748 | 8/1986 | Sato | 371/38 |

Primary Examiner—Michael R. Fleming
Attorney, Agent, or Firm—Finnegan, Henderson, Farabow, Garrett & Dunner

[57] ABSTRACT

An apparatus for detecting and correcting errors which occur when transferring data between a magnetic disk and the main memory of a magnetic disk system. Error detection apparatus determines the corrections of sectors of data as the sectors are transferred from a magnetic disk to main memory. A main controller is notified by the error detection apparatus as to which sectors of data have been transferred incorrectly, and are therefore in need of correction. At the request of the main controller, the sectors in need of correction, i.e., the sectors in error, are transferred from main memory to the main controller which has error correction apparatus. The main controller corrects the sectors in error and then returns the sectors in error to main memory. The main controller receives sectors in error from main memory, and transfers corrected sectors of data back to main memory only during free times when data is not being transferred between the main memory and a magnetic disk.

4 Claims, 2 Drawing Figures

APPARATUS FOR DETECTING AND CORRECTING DATA TRANSFER ERRORS OF A MAGNETIC DISK SYSTEM

BACKGROUND OF THE INVENTION

I. Field of the Invention

The present invention relates to an apparatus for detecting and correcting errors which occur when transferring data. More specifically, the present invention relates to an apparatus and related method for detecting and correcting errors which occur when transferring data between a magnetic disk and the main memory of a magnetic disk system.

II. Background Information

The likelihood of an error occurring when data is transferred between a magnetic disk and the main memory of a magnetic disk system exists at a given probability value. Accordingly, data being transferred between a magnetic disk and the main memory of a conventional magnetic disk system is checked to determine whether the data is being transferred correctly, and to permit correction of data transferred incorrectly. Check data which is generated in accordance with a check data-generating algorithm such as, for example, the Chinese Remainder Theorem method, is added to actual data for transfer for use in determining whether a data transfer error has occurred, i.e., to perform an error check.

The amount of check data generated for and added to a sector of actual data (that is, the data stored in a sector of a disk cylinder) varies according to the amount of data stored in a sector (length of the sector) and according to the particular check data-generating algorithm utilized to generate check data for the sector of actual data to be transferred. For example, when the length of a sector of a disk cylinder is 512 bytes, the amount of check data generated is about seven (7) bytes. (But, as stated above, the precise amount of check data generated varies in accordance with the check data-generating algorithm utilized.)

In order to perform an error check, check data is generated both when data is transferred to a magnetic disk, i.e., written, and when data is transferred from a magnetic disk, i.e., read. When writing, check data is generated in accordance with a check data-generating algorithm and added to a sector of actual data. The sector of actual data along with the check data is written to a magnetic disk. When reading the data which was written, the check data which was written, and is now being read, is compared with check data as originally generated by the check data-generating algorithm when the data was written. The comparison of the check data being read with the check data as originally generated reveals whether a data transfer error has occurred.

A conventional magnetic disk system typically includes apparatus which is specifically used for generating check data and for detecting a data transfer error, and also apparatus for correcting a data transfer error.

Typically, once a data transfer error has occurred, conventional error correcting apparatus of a magnetic disk system corrects the data transfer error by using any of three error correction techniques. The error may be corrected by utilizing a retrial technique, by utilizing an inverse check data algorithm technique, or by using a technique which is a hybrid of the retrial and inverse check data algorithm techniques.

With the retrial technique, a sector having data which has been incorrectly transferred is identified, and the data from that sector is transferred again. The inverse check data algorithm technique corrects an error, utilizing an algorithm which is an inverse of the algorithm which would be utilized to generate the check data read from magnetic disk, starting from the check data originally written to that magnetic disk.

When correcting an error using the retrial technique, a waiting period is required in which the sector of a magnetic disk, from which check data was incorrectly transferred, is rotated through at least one turn in order to bring the sector of that disk to a position so that the data may be transferred again. The retrial technique only permits error correction when data is being read. An error occurring when data is being written is not corrected by retrial.

When correcting an error using the inverse check data algorithm technique, an error which occurs either when reading or writing data may be corrected. However, the number of bits which may be corrected by this technique is restricted when writing data. For example, when an error occurs in the transfer of a sector of data of 512 bytes having 7 bytes of check data, the maximum number of error bits which may be corrected is about eleven (11). The precise number of error bits which may be corrected depends on the inverse check data algorithm used to perform the correction. Check data which is originally generated when writing a sector of actual data, and which is used when correcting data, is stored for correction purposes when the data is being written to a magnetic disk, thus permitting error correction to be performed in response to a data transfer error which takes place either when writing or reading data.

A waiting period, which is also at least the time required for one turn of a magnetic disk, is also required when correcting an error using the inverse check data algorithm technique. While a sector of actual data, the check data of which indicates that a data transfer error has occurred (i.e., a sector in error), is being corrected, the successive sectors which rotate at a fixed speed on the magnetic disk containing the sector in error rotate into position for transfer. Because an error correction is being performed, data transfer for the successive sectors cannot be performed, and the data transfer must await at least one rotation of the magnetic disk.

Because a waiting period of at least one magnetic disk rotation is required every time an error is detected and corrected by the conventional error and correction apparatus of a conventional magnetic disk system, regardless of the error correction technique used, such conventional apparatus are not suitable for use when large amounts of data are to be transferred at high speed, as when image data of a computerized tomography (CT) system is to be transferred rapidly between a magnetic disk and a main memory of the CT system.

OBJECTS AND SUMMARY OF THE INVENTION

Accordingly, an object of the present invention is to provide an apparatus and a related method for detecting and correcting errors which occur when transferring data between a magnetic disk and a main memory of a magnetic disk system, wherein data may be continuously transferred between the magnetic disk and main memory of the disk system even when an error has been detected.

Another object of the present invention is to provide an apparatus and a related method for detecting and correcting errors which occur when transferring data between a magnetic disk and a main memory of a magnetic disk system, wherein an error which has been detected may be corrected without a retransfer of the data.

Yet another object of the present invention is to provide an apparatus and a related method for detecting and correcting errors which occur when transferring data between a magnetic disk and a main memory of a magnetic disk system, the apparatus and related method being suitable for use when large amounts of data are to be transferred at high speed between the magnetic disk and main memory.

To achieve the foregoing objects, and in accordance with the purpose of the invention as embodied and broadly described herein, there is provided an apparatus for detecting and correcting errors which occur when transferring individual sectors of data between a magnetic disk and a main memory of a magnetic disk system comprising:

A data transfer interface disposed on a transfer path connecting the magnetic disk and the main memory, for successively transferring the individual sectors of data between the magnetic disk and the data transfer interface during a first period of time, and for successively transferring the individual sectors of data between the data transfer interface and the main memory during a second period of time, to write and read the individual sectors of data, the first period of time being at least twice as long as the second period of time, creating a free time period between the end of the second period of time and the end of the first period of time; check data generation means operatively connected to the transfer path for successively generating original check data for the individual sectors of data, and for affixing the original check data to the individual sectors of data at times when the individual sectors are written to the magnetic disk; error detection means operatively connected to the transfer path and to the check data generation means for generating an error signal indicating detection of an error sector in response to a difference between the original check data and the affixed check data for any of the individual sectors of data at times when the individual sectors are read from said magnetic disk; and error correction means responsive to the error signal for transferring the error sector from the main memory to the error correction means during a first the free time, and for correcting the error sector in accordance with the original check data and the affixed data to transfer a corrected error sector to the main memory during a second free time.

DESCRIPTION OF THE PREFERRED EMBODIMENT

Figure 1:
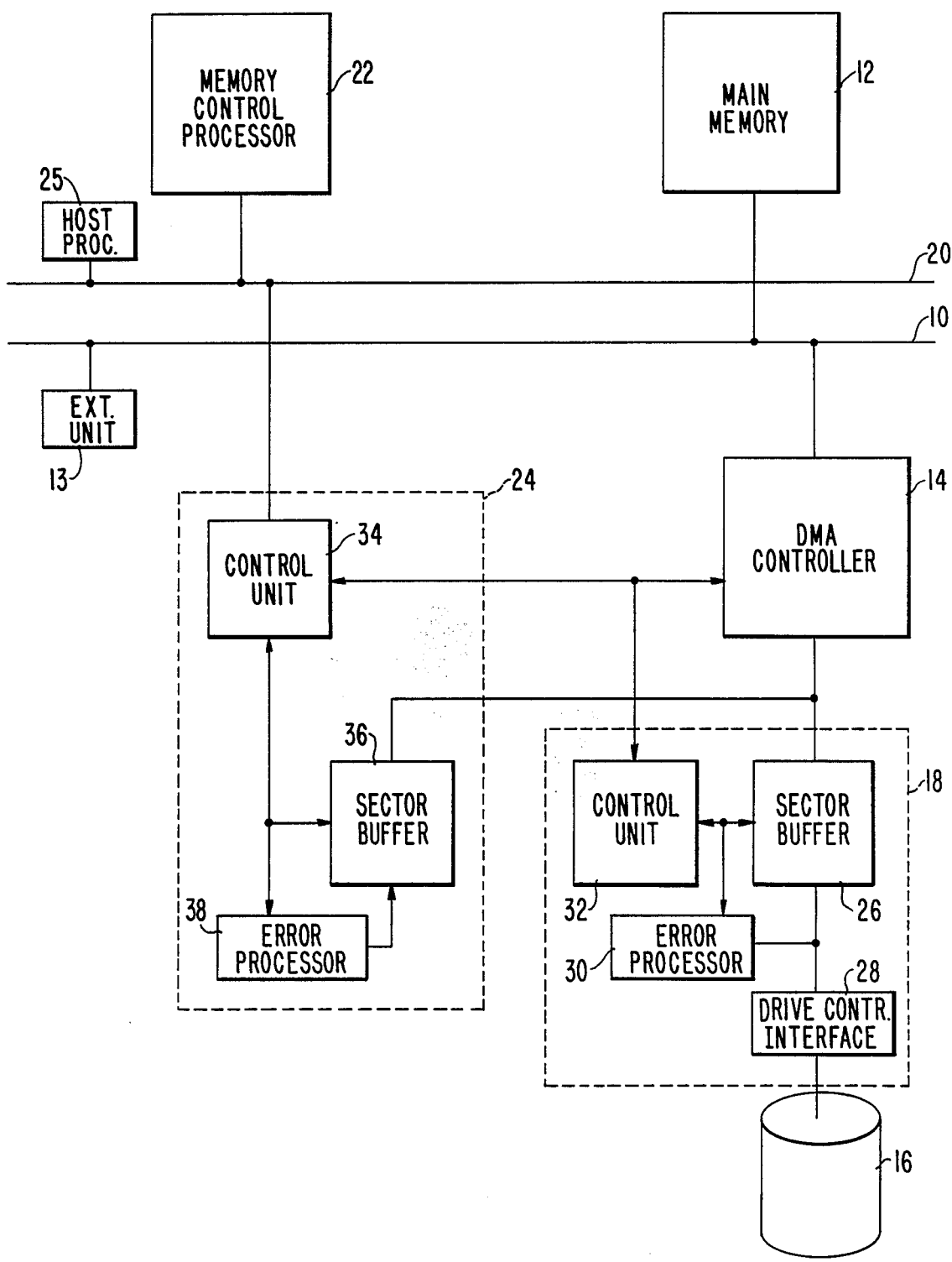
FIG. 1 is a block diagram of a magnetic disk system having apparatus for detecting and correcting errors which occur when transferring data between a magnetic disk and a main memory, wherein the apparatus shown incorporates the teachings of the present invention.

An apparatus embodying the teachings of the present invention for detecting and correcting errors which occur when transferring data between a magnetic disk and a main memory of a magnetic disk system is illustrated in FIG. 1 and described below.

The magnetic disk systems for which error detection and correction may be performed by apparatus of the present invention are of the type disclosed in U.S. Pat. No. 4,590,599 to the same assignee for the present invention. The need for error detection and correction apparatus as part of magnetic disk systems of the type considered here is discussed in U.S. Pat. No. 4,590,599. Basic hardware of such apparatus is also described in the foregoing patent.

The magnetic disk system includes a memory bus 10 connected to a main memory 12, a direct memory access (DMA) controller 14 and external unit 13 which may be, for example, a computerized tomography (CT) scanner or a CT display unit. Main memory 12 temporarily stores data in blocks of 128 bytes. The data stored in main memory 12 is received from external unit 13 (a CT scanner) over memory bus 10. Subsequently, the data in main memory 13 is transferred to magnetic disks of a disk drive 16. The data is transferred from main memory 12 to magnetic disks of disk drive 16 over memory bus 10 to DMA controller 14, and then through a disk drive interface 18 which is connected to DMA controller 14 and disk drive 16.

Main memory 12 also temporarily stores data transferred from disk drive 16 back through disk interface 18 and DMA controller 14 and over memory bus 10 to main memory 12. Subsequently, the data may be transferred from main memory 12 back to an external unit 13 (a CT display unit) over memory bus 10.

The magnetic disk system further includes a control bus 20. Control bus 20 is connected to a memory control processor 22, a main controller 24, an external unit 13 and a host processor 25.

Write or read commands are transferred from host processor 25 to memory control processor 22 over control bus 20. As described in U.S. patent application Ser. No. 915,062 to the same assignee of the present invention, which is hereby incorporated by reference, memory process controller 22, in response to a write or read command provided by host processor 25, provides main controller 24 with a read or write command, a leading main memory address, a leading sector address of a magnetic disk sector, and a number of sectors of data for transfer between magnetic disks of a disk drive and main memory.

Main controller 24 is connected to disk drive interface 18 and DMA controller 14. From the leading main memory address, leading sector address and number of sectors for transfer, main controller 24 determines and transfers to disk drive interface 18 a disk cylinder number, a disk surface number, a leading sector number, the number of sectors of data for transfer and the direction of transfer (write or read) for each disk rotated by disk drive 16. The leading memory address, which specifies the leading location from which or to which data is to be transferred, is provided to DMA controller 14. Main controller 24, as described below, corrects errors which occur when data is transferred between main memory 12 and magnetic disks of disk drive 16.

Disk drive interface 18, utilizes the information transferred from main controller 24 to control the transfer of data between a data transfer head of disk drive 16 and a magnetic disk of disk drive 16. The data transfer head writes data to and reads data from a magnetic disk and determines the current sector of a magnetic disk, that is, the disk sector over which the data transfer head is currently positioned. Disk drive interface 18 determines whether the current sector is one of or adjacent one of a range of sectors to which data is to be written or from which data is to be read. The range of sectors is determined in accordance with the leading sector address and the number of sectors of data for transfer. When the current sector is one of, or adjacent one of, the range of sectors for transfer, the data transfer head performs a data transfer (writes or reads data). Data from main memory 12 to be written to a magnetic disk is converted from parallel form to serial form by disk drive interface 18. Data read from a magnetic disk is converted from serial form to parallel form by disk interface 18.

DMA controller 14 polls disk drive interface 18 and main controller 24 for transfer requests indicating that a transfer of data is to be made. The transfer requests indicates the direction of the transfer, the transfer request being a "0" if data is to be transferred to main memory 12, and a "1" if data is to be transferred to a magnetic disk of disk drive 16 (under normal operating conditions) or to main controller 24 (when an error correction is to be performed).

When a transfer request is received by DMA controller 14, DMA controller 14 secures from disk drive interface 18 the current sector number of the sector involved in the transfer in order to calculate a corresponding main memory address. The corresponding address is calculated, using the leading main memory address and the number of the current sector which is involved in the data transfer. Data is transferred between the corresponding main memory address and the data transfer head positioned above the current sector of a magnetic disk, through DMA controller 14 in accordance with the transfer direction specified by transfer request.

Disk drive interface 18 includes a sector buffer 26, a drive control interface 28, an error processor 30 and a control unit 32. Sector buffer 26 is connected to main controller 24 and DMA controller 14. Sector buffer 26 temporarily stores sectors of data being transferred between main memory 12 and the magnetic disk through DMA controller 14. Sector buffer 26 is a "double buffer" capable of storing, simultaneously, a sector of data which is being transferred intermediately between main memory 12 and disk drive interface 18, and a sector of data being transferred intermediately between disk drive interface 18 and a magnetic disk of disk drive 16.

Sector buffer 26 is connected directly to drive control interface 28 and indirectly to drive control interface 28 through error processor 30. The path between DMA controller 14 and disk drive 16 formed by sector buffer 26 and drive control interface 28 is the path through which data is transferred to and from a magnetic disk of disk drive 16. When data is transferred to a magnetic disk of disk drive 16 (i.e., written) through sector buffer 26, error processor 30 generates 7 bytes of check data from the 512 bytes of actual data supplied through sector buffer 26. The check data is obtained in accordance with a check data-generating algorithm as, for example, the Chinese Remainder Theorem method. The check data obtained is affixed to the 512 bytes of actual data and then supplied to drive control interface 28. The actual data and check data are written to a magnetic disk by a data transfer head. The check data generated for the sector of actual data is retained by error processor 30 for later use.

In response to a read command, both actual data and the check data affixed to the actual data are read from a magnetic disk by a data transfer head. Error processor 30 matches the 7 bytes of check data stored when the actual data was written to a magnetic disk with the 7 bytes of check data presently affixed to the actual data. The stored check data is compared with the affixed check data to determine whether there has been an error in the transfer of the data. If the stored check data and the affixed check data are not identical, error processor 30 generates an error signal.

Whether or not an error signal has been generated by error processor 30, the actual data and the affixed check data are transferred to sector buffer 26, then through DMA controller 14 to main memory 12. That is, the data to be read is transferred to main memory 12 despite the fact that an error has been detected. Accordingly, the speed at which data is being transferred between main memory 12 and a magnetic disk of disk drive 16 is not affected by the detection of an error. Drive control interface 28 of disk interface 18 performs the serial to parallel and parallel to serial conversion of data as described above. Drive control interface 28 also positions the data transfer head over a magnetic disk to write or read data.

Control unit 32 of disk drive interface 18 is connected to sector buffer 26 and error processor 30. Control unit 32 controls sector buffer 26 and error processor 30 in accordance with the disk cylinder number, disk surface number, sector number and direction of transfer received from main controller 24. Control unit 32 also controls drive control interface 28.

Drive control interface 28 positions a data transfer head over the cylinder and surface of a magnetic disk specified by control unit 32. When the magnetic head comes to the leading edge of a sector, the magnetic head reads the number of that sector, i.e., the current sector, and control unit 32 determines whether the current sector number indicates that a data transfer is to be performed.

In the case of where a write command has been received by control unit 32 of disk drive interface 18, control unit 32 determines whether the next sector which is to receive data will be rotated under the magnetic head immediately after the current sector is rotated under the magnetic head. If a sector, which is to receive data, is to be next rotated under the magnetic head, control unit 32 requests DMA controller 14 to transfer data. The data is transferred to sector buffer 26 through DMA controller 14. Sector buffer 26 transfers the data to the magnetic disk of disk drive 16 through drive control interface 28 when the next sector is rotated under the data transfer head.

In the case where a read command has been received by control unit 32 of disk drive interface 18, the current sector number is transferred from disk control interface 18 to control unit 32 which determines whether the current sector is a sector having data for transfer to main memory 12. If the current sector is a sector having data for transfer to main memory 12, control unit 32 requests DMA controller 14 to transfer the data to main memory 12, and provides the current sector number to DMA controller for use in calculating the corresponding main memory address to which the data from the current sector is to be transferred. The data is then transferred by DMA controller 14 from sector buffer 26 to main memory 12.

In response to an error status signal generated by error processor 30, the original check data generated for a sector of actual data is transferred from error processor 30. Control unit 32 temporarily stores the check data, and generates an error status signal which is detected by main controller 5.

Main controller 5 includes a control unit 34, a sector buffer 36 and an error processor 38. Control unit 34 is connected to memory control processor 22 by control bus 20 and is also connected to DMA controller 14, control unit 32 of disk drive interface 18, and an error processor 38 of main controller 24. Control unit 34 of main controller 24 receives from memory control processor 10 a write or read command, the leading main memory address, and the number of transfer sectors for a transfer of data. Control unit 34 determines a disk cylinder number, disk surface number, sector number and transfers this information to control unit 32 of disk drive interface 18 along with the number of sectors of data for transfer and the direction of the transfer. Control unit 34 transfers the leading memory address for the transfer to DMA controller 14.

In response to an error status signal from control unit 32 of disk drive interface 18, control unit 34 reads and holds check data temporarily stored in control unit 32, and also obtains the sector number for the sector, the check data of which caused the error status signal to be generated by error processor 30, i.e., the sector in error. Subsequently, control unit 34 transfers the check data to error processor 38 of main controller 24. After transferring the check data to error processor 38, control unit 34 issues a transfer request to DMA controller 14.

Control unit 34 of main controller 24 is also connected to sector buffer 36. Sector buffer 36 is connected to error processor 38 and DMA controller 14.

In response to the transfer request received from control unit 34 of main controller 24, DMA controller 14 obtains the sector number for the sector in error from control unit 34, and calculates the corresponding main memory address to which the data from the sector in error was transferred. At a time as described below, the data from the sector in error is read from the corresponding main memory address through DMA controller to sector buffer 36 of main controller 24.

Error processor 38 corrects the data stored in sector buffer 36 of main controller 24 in accordance with the check data for the sector in error stored in control unit 34. As described in connection with FIG. 2, correction of the data takes place in a manner which does not impede the transfer of data between main memory 12 and a magnetic disk of disk drive 16.

Error processor 32 of disk interface 18 and error processor 38 of main controller 24 may be, for example, type AM9520 devices commercially available from Advanced Micro Device Company.

Figure 2:
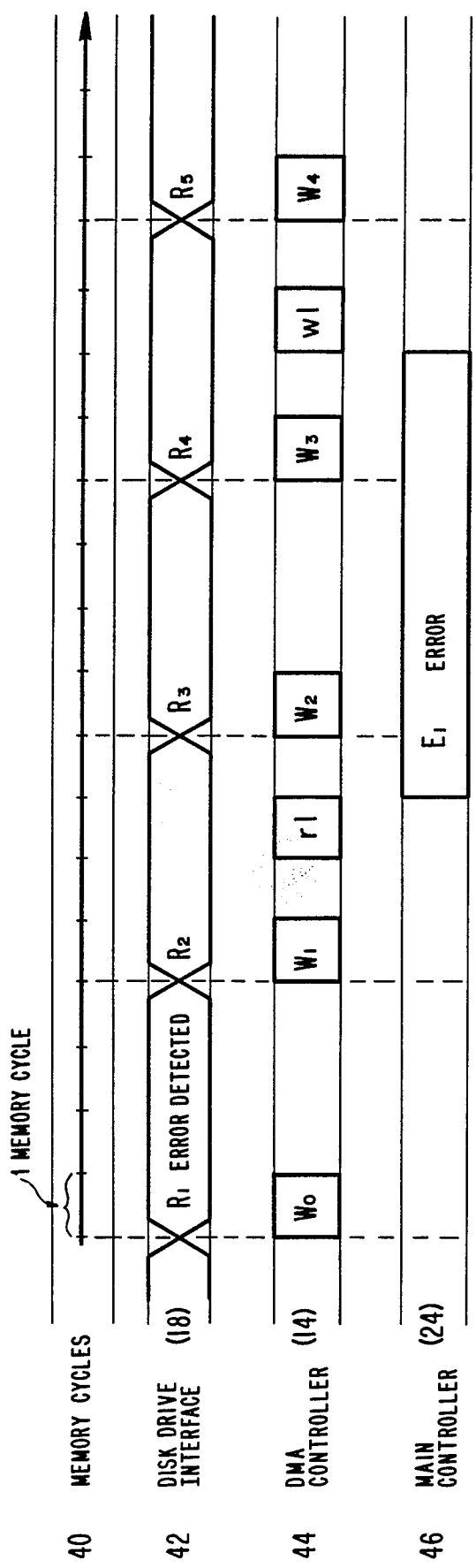
FIG. 2 is a timing chart for the apparatus of FIG. 1.

Referring to the timing chart for the magnetic disk system of FIG. 2, the operation of the magnetic disk system is further described.

The time required to transfer a sector of data from sector buffer 32 or 36 to main memory 12 is defined as a memory cycle and is shown on memory cycle timing bar 40 of FIG. 2. Timing bar 42 shows the time required to read a sector of data from a magnetic disk of disk drive 16 to disk interface 18. In FIG. 2, disk interface 18 is depicted as reading data synchronously with the memory cycle, i.e., the reading of data, which takes place in a time period $R_1, R_2, R_3 \ldots$, commences simultaneously with the start of a memory cycle. Usually, however, data is read asynchronously. The time required for reading data from a magnetic disk of disk drive 16 and including the time required to perform an error check of the data read is longer than the memory cycle, and sufficiently lengthy so that the timing for the present invention may be implemented as described below. In the embodiment of the present invention described here, the time needed for writing or reading data to or from a magnetic disk is necessarily at least twice as long as the memory cycle time.

Data read from a magnetic disk is transferred to sector buffer 26 whether or not error processor 30 has detected an error in the check data for the sector of data transferred. DMA controller 14 receives a transfer request from disk interface 18 for the data to be transferred (a '0' when reading, as here) and the sector number of the data which is needed to determine the corresponding main memory address of the location to which the data is to be transferred. The data being held in sector buffer 26 is thereafter transferred to the appropriate location of main memory 12.

The data read from a magnetic disk to DMA controller 14 in times periods $R_1, R_2, R_3 \ldots$ as shown in timing bar 42 of FIG. 2 is subsequently transferred from DMA controller 14 to main memory 12 in time periods $W_1, W_2, W_3 \ldots$ as shown in timing bar 44. The transfer of data from DMA controller 14 to main memory 12 in time periods $W_1, W_2, W_3 \ldots$ is unaffected by the detection of an error by error processor 30 during any of the time period $R_1, R_2, R_3 \ldots$ For example, when error processor 30 determines that data transferred during the time period $R_1$ has been transferred incorrectly, i.e., "ERROR DETECTED", main controller 24 makes a transfer request to DMA controller 14 for the sector of data having an error. At that time the sector of data is already being transferred, or has already transferred to main memory 12. In response, DMA controller 14 calculates the location of main memory 12 in which the sector of data having an error is stored, and transfers the sector of data having an error from main memory 12 to DMA controller 14 and then to sector buffer 36 of main controller 34 during a time r1 as shown in bar timing 44. As shown, transfer of the sector in error to sector buffer 36 takes place during an "empty time" in which DMA controller 14 is not needed to transfer data between main memory 12 and a magnetic disk. Accordingly, the transfer of data to main memory 12 from a magnetic disk of disk drive 16 is not impeded by the transfer of a sector of data in error to sector buffer 36 for correction.

During a time $E_1$, as shown in timing bar 46, error processor 38 of main controller 24 corrects the data of the sector in error. The error correction is done utilizing check data for the sector in error supplied from control unit 34. The time required to correct data is approximately 2 milliseconds, but varies in accordance with the inverse check data or other correction algorithm used. The time required is longer than that required to detect an error.

After the sector of data in error has been corrected by error processor 38 of main controller 24, control unit 34 makes a transfer request to DMA controller 14 to write the corrected sector of data back to main memory 12. During a time w1, DMA controller 14 transfer the corrected sector of data back to the location of main memory 12 from which the uncorrected sector of data, i.e., the sector in error was read. As shown in timing bar 44, transfer of the corrected sector of data also takes place during an "empty time" in which DMA controller is not needed to transfers data between main memory 12 and a magnetic disk of disk drive 16. Accordingly, the transfer of data to main memory 12 from a magnetic disk of disk drive 16 is not impeded by the transfer of a corrected sector of data to main memory 12.

Sectors in error are corrected by transferring data from main memory 12 and not by performing a second transfer to or from a magnetic disk. Transfers of data to or from a magnetic disk require more time than a transfer to or from main memory 12.

In the present embodiment, there is "empty time" in which to accomplish the correction of data as long as the memory cycle time is half as long as the time required for transferring data to or from a magnetic disk.

In view of the foregoing, it should be understood that in addition to disclosure of an apparatus for detecting and correcting errors which occur when transferring data between a magnetic disk and the main memory of a magnetic disk system, a related method has also been described for detecting and correcting data transfer errors. This method, in its generic form, may be said to comprise the steps of: successively transferring individual sectors of data between the data magnetic disk and a data transfer interface during a first period of time, and for successively transferring the individual sectors of data between the data transfer interface and the main memory during a second period of time, to write and read the individual sectors of data, the first period of time being at least twice as long as the second period of time, creating a free time period between the end of the second period of time, and the end of the first period of time; successively generating original check data for the individual sectors of data and for affixing said original check data to the individual sectors of data at times when the individual sectors are written to the magnetic disk; generating an error signal indicating detection of an error sector in response to a difference between the original check data and the affixed check data for any of the individual sectors of data at times when the individual sectors are read from the magnetic disk; transferring the error sector from the main memory to an error correction means during a first free time in response to the error signal; and correcting the error sector in accordance with the original check data and the affixed data to transfer a corrected error sector from the error correction means to the main memory during a second free time.

It should be apparent to those skilled in the art that various modifications may be made to the magnetic disk system of the subject invention without departing from the scope or spirit of the inventor. For example, although a magnetic disk drive is referred to in the description of the invention, a plurality of disk drives may be used. Thus, it is intended that the invention cover modifications and variations of the invention, provided they come within the scope of the appended claims and their legally entitled equivalents.

We claim:

1. An apparatus for detecting and correcting errors which occur when transferring individual sectors of data between a magnetic disk and a main memory of a magnetic disk system comprising:

a data transfer interface disposed on a transfer path connecting said magnetic disk and said main memory, for successively transferring said individual sectors of data between said magnetic disk and said data transfer interface during a first period of time, and for successively transferring said individual sectors of data between said data transfer interface and said main memory during a second period of time to write and read said individual sectors of data, said first period of time being at least twice as long as said second period of time, creating a free time period between the end of said second period of time and the end of said first period of time;

check data generation means operatively connected to said transfer path for successively generating original check data for said individual sectors of data and for affixing said original check data to said individual sectors of data at times when said individual sectors are written to said magnetic disk;

error detection means operatively connected to said transfer path and to said check data generation means for generating an error signal indicating detection of an error sector in response to a difference between said original check data and said affixed check data for any of said individual sectors of data at times when said error sectors are read from said magnetic disk; and error correction means responsive to send error signal for transferring said error sector from said main memory to said error correction means during a first said free time, and for correcting said error sector in accordance with said original check data and said affixed data to transfer a corrected said error sector from said error correction means to said main memory during a second said free time.

2. The apparatus of claim 1 wherein said error correction means includes:

sector buffer means connected to said data transfer interface for storing said error sector and said affixed check data;

control means connected to said error detection means and said data transfer interface for storing said original check data of said error sector for initiating transfer of said error sector to said sector buffer means from said main memory through said data transfer interface in response to receipt of said error signal, and for initiating transfer of said corrected error sector to said main memory in response to the completion of said correction by said error correction means;

error processor means connected to said controller means and said sector buffer means for correcting said error sector stored in said sector buffer means in accordance with said original check data and said affixed check data of said sector buffer means in response to said error signal.

3. The apparatus of claim 1 wherein said check data generation means and said error detection means comprise a single check data generation and error detection means, said single check data generation and error detection means being connected to said error correction means and said data transfer interface through a controller for controlling said single check data generation and error detection means and for transferring said original check data and error signal to said error correction means.

4. A method for detecting and correcting errors which occur when transferring individual sectors of data between a magnetic disk and a main memory of a magnetic disk system comprising the steps of:

successively transferring said individual sectors of data between said magnetic disk and a data transfer interface during a first period of time, and for successively transferring said individual sectors of data between said data transfer interface and said main memory during a second period of time, to write and read said individual sectors of data, said first period of time being at least twice as long as said second period of time, creating a free time period between the end of said second period of time, and the end of said first period of time;

successively generating original check data for said individual sectors of data and for affixing said original check data to said individual sectors of data at times when said individual sectors are written to said magnetic disk;

generating an error signal indicating detection of an error sector in response to a difference between said original check data and said affixed check data for any of said individual sectors of data at times when said individual sectors are read from said magnetic disk;

transferring said error sector from said main memory to an error correction means during a first said free time in response to said error signal; and correcting said error sector in accordance with said original check data and said affixed data to transfer a corrected said error sector from said error correction means to said main memory during a second said free time.

* * * * *